United States Patent [19]

Albrecht et al.

[11] Patent Number: 4,847,032
[45] Date of Patent: Jul. 11, 1989

[54] PROCESS FOR PRODUCING HOLLOW BODIES FROM THERMOPLASTIC MATERIAL

[75] Inventors: Peter Albrecht, Hamburg; Adolf Appel, Egestorf; Karl-Heinz Balkau, Oststeinbek; Edward Clar, Hamburg; Claus Horwege, Hamburg; Wolfgang Reymann, Hamburg; Klaus Vogel, Barsbüttel; Walter Wiedenfeld, Hamburg, all of Fed. Rep. of Germany

[73] Assignee: Krupp Corpoplast Maschinenbau GmbH, Hamburg, Fed. Rep. of Germany

[21] Appl. No.: 246,889

[22] Filed: Sep. 15, 1988

Related U.S. Application Data

[63] Continuation of Ser. No. 10,939, Feb. 5, 1987, abandoned.

[30] Foreign Application Priority Data

Feb. 7, 1986 [DE] Fed. Rep. of Germany ....... 3603846

[51] Int. Cl.⁴ ................. B29C 55/22; B29C 55/30
[52] U.S. Cl. .................. 264/322; 264/292; 264/323; 264/521; 264/532
[58] Field of Search ............ 264/291, 292, 322, 323, 264/519, 532, 520, 521; 425/393

[56] References Cited

U.S. PATENT DOCUMENTS

| | | |
|---|---|---|
| 3,182,475 | 5/1965 | Dilling . |
| 3,205,290 | 9/1965 | Covington, Jr. et al. . |
| 3,213,663 | 10/1965 | Coan . |
| 3,217,521 | 11/1965 | Dilling . |
| 3,284,560 | 11/1966 | King et al. . |
| 3,444,715 | 5/1969 | Sellars . |
| 3,492,387 | 1/1970 | Larson . |
| 3,514,468 | 5/1970 | Sutcliffe et al. . |
| 3,540,259 | 11/1970 | Hinshaw . |
| 3,564,884 | 2/1971 | Hinshaw . |
| 3,602,030 | 8/1971 | Noda et al. . |
| 3,929,959 | 12/1975 | Findlay et al. . |
| 3,929,960 | 12/1975 | Findlay et al. . |
| 4,065,951 | 1/1978 | Lyu . |
| 4,134,949 | 1/1979 | McGregor ............... 264/519 |
| 4,420,454 | 12/1983 | Kawaguchi et al. . |
| 4,554,815 | 11/1985 | Weishalla . |
| 4,564,495 | 1/1986 | Nilsson et al. ............. 264/292 |

FOREIGN PATENT DOCUMENTS

| | | |
|---|---|---|
| 1704405 | 7/1971 | Fed. Rep. of Germany . |
| 2320176 | 3/1977 | France . |
| 2516855 | 5/1983 | France . |
| 2534519 | 4/1984 | France . |
| WO8600565 | 11/1986 | PCT Int'l Appl. . |
| 626863 | 7/1949 | United Kingdom . |
| 724251 | 6/1950 | United Kingdom . |
| 1352002 | 5/1974 | United Kingdom . |
| GB2052364A | 1/1981 | United Kingdom . |
| 2085798A | 5/1982 | United Kingdom . |
| 2090786A | 7/1982 | United Kingdom . |
| 2092943 | 8/1982 | United Kingdom . |

Primary Examiner—Jan H. Silbaugh
Assistant Examiner—Neil M. McCarthy
Attorney, Agent, or Firm—Panitch, Schwarze, Jacobs and Nadel

[57] ABSTRACT

A process for producing hollow bodies from oriented thermoplastic material wherein a cylindrical portion of a heated hollow preform which has a bottom thereon is subjected to stretching at a starting temperature which is below the vitreous transition temperature of the thermoplastic material, with the wall thickness of the preform being reduced in the stretching operation. Prior to the stretching operation the preform is heated in the portion in which the stretching effect begins, to a temperature higher than in the portion adjoining same. Stretching is preferably effected along the axis of the preform at different rates such that in the portion of the preform at which stretching begins, stretching is effected at a lower rate than in the portion adjoining same in the stretching direction.

3 Claims, 4 Drawing Sheets

PROCESS FOR PRODUCING HOLLOW BODIES FROM THERMOPLASTIC MATERIAL

This application is a continuation of U.S. patent application Ser. No. 07/010,939, filed Feb. 5, 1987, and now abandoned.

BACKGROUND OF THE INVENTION

One form of process for the production of hollow bodies or articles from oriented thermoplastic material comprises taking a hollow preform which has a bottom, heating the cylindrical portion of the preform and then subjecting it to a stretching operation at a starting temperature which is below the vitreous transition temperature, with the wall thickness of the preform being reduced at the same time. Such a process is used, preferably when employing preforms of linear polyesters, for example polyethylene teraphthalate (PETP) or polylutylene teraphthalate (PBTP), for example when there is a need to produce containers for materials which are under a high pressure, such as for example drinks containing carbon dioxide gas. The operating procedure involved in such a process is generally such that the heated preform which is of a generally cup-like configuration and which may be produced for example by injection molding to constitute a parison member is stretched over a mandrel whose length corresponds at least to that of the preform when stretched and whose outside diameter substantially corresponds to the inside diameter of the preform which is substantially the same as that of the article when in the stretched condition. The stretching operation is generally carried out in such a way that, starting from the bottom end of the preform, a drawing ring is moved along the cylindrical wall portion of the preform, towards the free end thereof. During that movement of the drawing ring, the wall portion along which the ring moves is stretched for example to three to four times its initial length, while at the same time the wall thickness thereof is also substantially reduced. The mandrel employed within the preform performs inter alia the function of supporting the wall poriton of the preform which is to be stretched in that way in order thereby to prevent a reduction in the diameter thereof during the stretching operation.

In order to achieve a high level of output in that procedure, it is desirable for the stretching operation to be carried out at the highest speed that can be reasonably attained in order thereby to minimise the amount of time required for thatpurpose. On the other hand however it is not possible to increase the rate at which the stretching effect is produced, to just any random value, as that involves the risk of adversely affecting the quality of the end product. An aspect which is of importance in that connection is that the temperature of the preform and the admissible speed of stretching in the preform stretching operation are related insofar as the stretching speed can be increased with increasing temperature. Although it is possible therefore to stretch the preform at ambient temperature, that can only be done at a very low speed. The use of higher speeds of stretching requires the preform to be heated beforehand, but the temperature thereof should be below the vitreous transition temperature. Another point to be taken into consideration in that connection is that during the stretching operation, due to the work involved in changing the shape of the preform, the preform experiences an additional rise in temperature, the extent of which is also dependent on the speed of the stretching operation. Accordingly, when heating the preform prior to carrying out the stretching operation, the procedure is to be such that the temperature which obtains after the heating operation is below the vitreous transition temperature to such an extent that, even after the following rise in temperature due to the work involved in transforming the preform into the finished article, during the stretching operation, at least the predominant part of the wall of the preform which is to undergo stretching is still below the vitreous transition temperature.

The initial phase of the stretching operation requires particular care to be taken. That applies in particular in regard to the commencement of the initial phase, that is to say, when the drawing ring begins to produce its effect on the preform. In that part of the operation it is necessary in any case to effect stretching at a lower rate so that the flow of the material forming the preform, which is necessary to give the desired effect, that is to say, to produce the necessary orientation of the molecules in the preform material, is caused to begin in such a manner as to avoid overloading of the material, which could result in defects in the finished product or which could also result in the preform becoming torn apart during the stretching operation. It is further necessary to ensure that the initial phase of the stretching operation and in particular the commencement thereof takes place in the same manner from one working operation to the next, that is to say from one preform to another, in order thereby to give product which have the same properties. If the force for carrying out the drawing operation by moving the drawing ring along the preform were to be applied abruptly to the preform, that could give rise to irregularities and lack of uniformity in the finished article, in regard to the portion of the preform at which the flow of the preform material begins and also in respect of the way in which material flow is caused, in particular in the initial phase. A further point to observe in that connection is that the region of the preform at which the stretching operation begins does in any case represent the transitional region between the cylindrical wall portion which is to be stretched by the action of the drawing ring, and the bottom of the preform, which does not undergo any stretching effect. It will be appreciated that the above-mentioned transitional region in which different parts of the preform, namely the bottom and the cylindrical wall portion thereof, which have different properties and are possibly also of different thicknesses, blend into each other, is particularly critical in regard to the quality of the end product so that for that reason also it is necessary to provide for a defined and reproducible initial phase in the stretching operation in order to arrive at a given and defined result.

SUMMARY OF THE INVENTION

An object of the present invention is to provide a process for producing hollow bodies from oriened thermoplastic material, which enjoys a higher level of output.

Another object of the present invention is to provide a process for producing hollow bodies from thermoplastic material in a rational and efficient manner, while giving high-quality products.

Still another object of the present invention is to provide a process for producing hollow bodies from oriented thermoplastic material, using heated preforms which are subjected to stretching, in such a fashion as to increase the level of output while retaining a consistently high quality of product.

In accordance with the present invention, these and other objects are achieved by a process for producing hollow bodies from oriented thermoplastic material, wherein the cylindrical region of a heated hollow preform which has a bottom is subjected to stretching or elongation at an initial temperature which is below the vitreous transition temperature, with the wall thickness being reduced at the same time in the stretching operation. The portion of the preform at which the stretching operation begins is heated prior to the stretching operation to a higher temperature than in the portion of the preform adjoining same.

In a preferred form of the process according to the invention, the portion of the preform which is heated to the above-mentioned higher temperature approximately corresponds to a transitional region between the bottom of the preform, which remains substantially unaffected by the stretching operation, and the cylindrical wall portion thereof.

The teaching in accordance with the present invention also takes account of the fact that, in the initial phase of the stretching operation, the additional supply of heat due to the energy involved in changing the shape of the preform is necessarily less than in the subsequent phases of the stretching operation which follow on from the intial phase.

The temperature difference which is produced in the heating operation prior to the stretching operation, between the portion of the preform in which the stretching operation commences and the portion adjoining same, does not need to be very substantial, especially as the aim in any case is to go as close as possible to the vitreous transition temperature without exceeding that temperature at least in the major parts of the wall of the preform. Practical experience has shown that the temperature in the portion of the preform at which the operation of stretching same begins may be at around 70 to 75° C. whereas in the portion adjoining same, which is to be at a lower temperature, the temperature therein may be about 65° C.

In accordance with a further feature of the invention, the operating procedure involved may be such that the preform is stretched along the axis thereof at different speeds in such a way that in the portion at which the stretching operation begins, the preform is stretched at a lower rate or speed than in the portion adjoining same, as considered in the direction of stretching. The procedure may be such that the region in which the preform is stretched at the lower rate substantially corresponds to the portion of the preform which is at a higher temperature, that is to say the region at the transition between the bottom of the preform and the cylindrical wall portion thereof.

In practice the speeds involved in the stretching operation are selected in dependence on the respective applicable parameters such as the properties of the plastic material which is to undergo stretching, the initial wall thickness of the preform in the portion thereof which is to be stretched and the temperature, for example such that is the phase involving a lower speed of stretching, that speed is around 1 metre per minute. That speed can then be increased in the adjoining portion of the preform to for example a value of around 3 metres per minute and can then be maintained at that value as far as the free end of the preform.

The higher speed or rate of stretching of the preform in the second portion thereof results in a substantial additional heating effect, at least in respect of parts of the preform, as a result of the greater amount of energy involved in changing the form of the preform. Thus, in spite of the lower temperature at which the wall portion of the preform had been heated in that second portion thereof prior to the beginning of the stretching operation, in the ultimate result the temperature of the material in that portion, at the time of the stretching operation, does not need to be substantially lower than in the first portion at which the stretching operation begins.

Although the speed of preform stretching in the portion thereof in which the stretching operation begins is markedly lower, in spite of the higher temperature to which that portion is heated, than in the portion adjoining same, it is however markedly higher than when carrying out a known form of a process for producing a hollow body from a thermoplastic material by stretching a hollow preform, as referred to above, so that, taken overall, the operation of stretching a preform by means of the process according to the invention can be carried out in a comparatively short time, thereby making it possible to achieve a higher rate of output. On the other hand the stretching speed in the portion of the preform at which the stretching operation begins is always still so low that the drawing ring can satisfactorily engage the preform to commence stretching thereof, while overstressing of the preform material is also avoided in the initial phase of the stretching operation. The subsequent increase in speed is also made possible by virtue of the fact that in the initial phase which takes place at a lower speed of stretching, the material which is to undergo stretching, namely the wall portion of the cylindrical part of the preform, has the opportunity to be supported uniformly on the support shoulder provided in the drawing ring, over the entire periphery of the ring and thus of the cylindrical wall portion of the preform, so that, in spite of the high speed in the phase subsequent to the initial phase of the stretching operation, the material of the preform is caused to flow in a satisfactory manner over the entire periphery of the drawing ring.

Further objects, features and advantages of the present invention will become apparent from the following description of a preferred embodiment thereof.

DESCRIPTION OF THE PREFERRED EMBODIMENT

Figures 1, 2, 3:
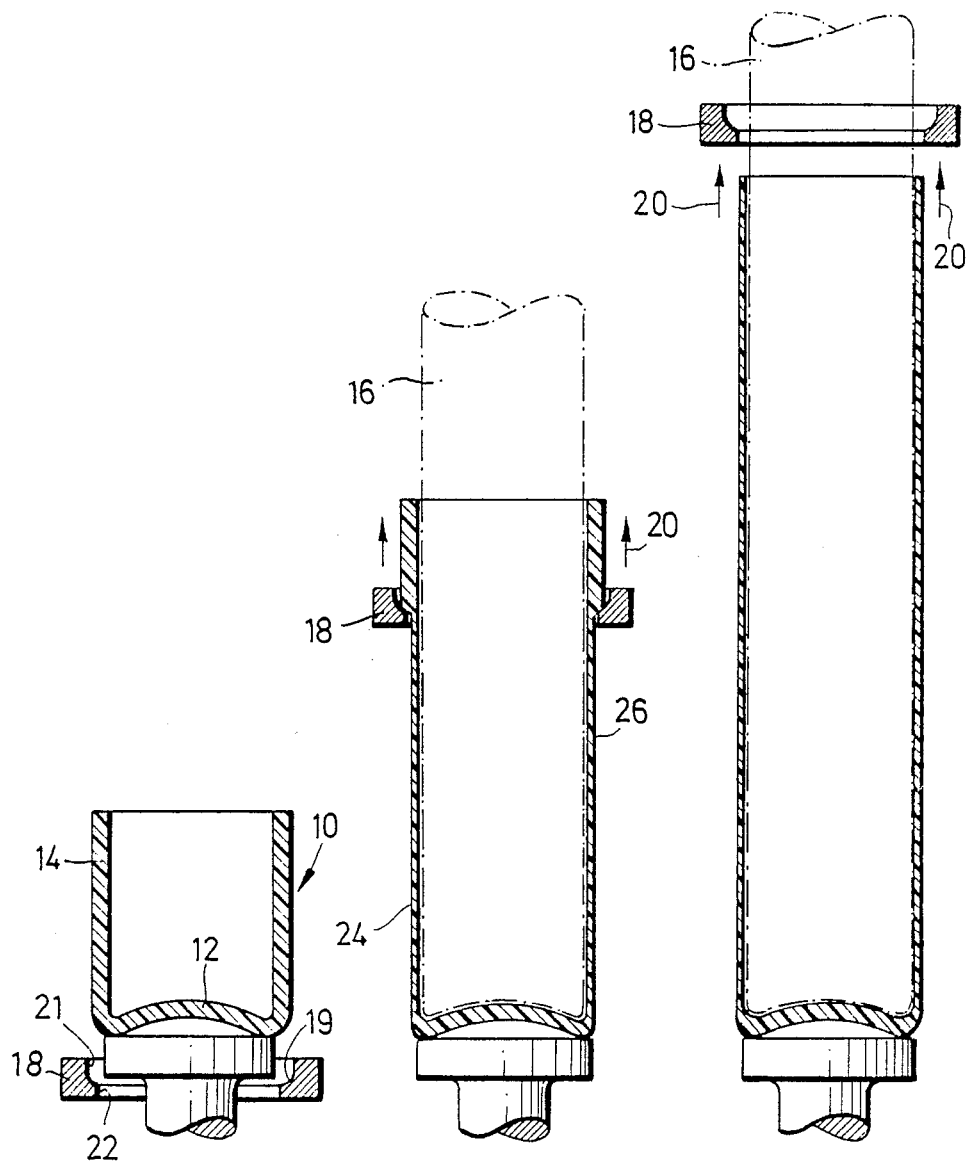
FIG. 1 is a view in longitudinal section through a preform.
FIG. 2 is a view in longitudinal section through the preform during the stretching operation using a drawing ring.
FIG. 3 is a view in longitudinal section through the stretched article produced by operation of the drawing ring.
Figure 4:
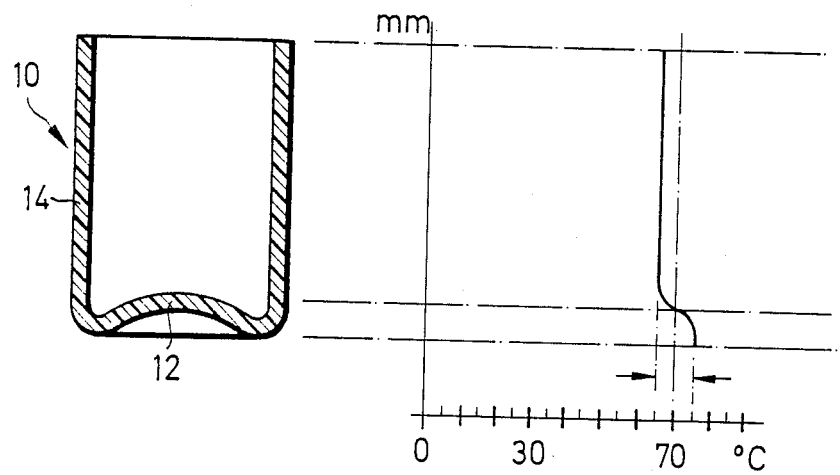
FIG. 4 is a graph showing the variation in temperature along the longitudinal axis of the preform.

Referring firstly to FIGS. 1 and 4, shown therein is a preform 10 which is of a generally cup-like configuration, comprising a bottom portion 12 and an adjoining substantially cylindrical wall portion 14. In order to achieve the desired mechanical properties in the end product to be manufactured, the cylindrical wall portion 14 is subjected to a stretching action in the direction of its longitudinal axis in such a way that for example the wall thicknesss of the cylindrical portion 14 is reduced to about one third of its initial thickness.

The apparatus structure for carrying out the stretching operation essentially comprises a mandrel as indicated at 16 in FIGS. 2 and 3 and a drawing ring 18 which is disposed around the mandrel 16, with the wall of the cylindrical portion 14 of the preform 10 disposed between the mandrel 16 and the ring 18.

On its radially inward facing side, the ring 18 is provided with a support shoulder 19 extending around the ring 18 and being of a conical configuration in cross-section such that the inside diameter of the support shoulder 19 decreases in the opposite direction to the direction in which the drawing ring 18 moves in the stretching operation, that direction being indicated by the arrow 20 in FIGS. 2 and 3. In the larger-diameter portion 21 of the ring 18, which is above the shoulder 19 for example in FIG. 1, the inside diameter of the ring 18 is such that it is somewhat larger than the outside diameter of the cylindrical portion 14 of the preform 10 in the initial, that is to say unstretched condition, as shown in FIG. 1. In the region 22 of smaller inside diameter, which is below the support shoulder 19 in FIG. 1, that inside diameter is such that it is slightly larger than the outside diameter of the portion 24 of the preform 10, which has already been stretched, as shown in FIG. 2, so that between the outside peripheral surface 26 of the stretched portion of the preform 10 and the portion of smaller inside diameter of the drawing ring 18 there is an annular gap which however is of relatively small radial magnitude.

Figure 5:
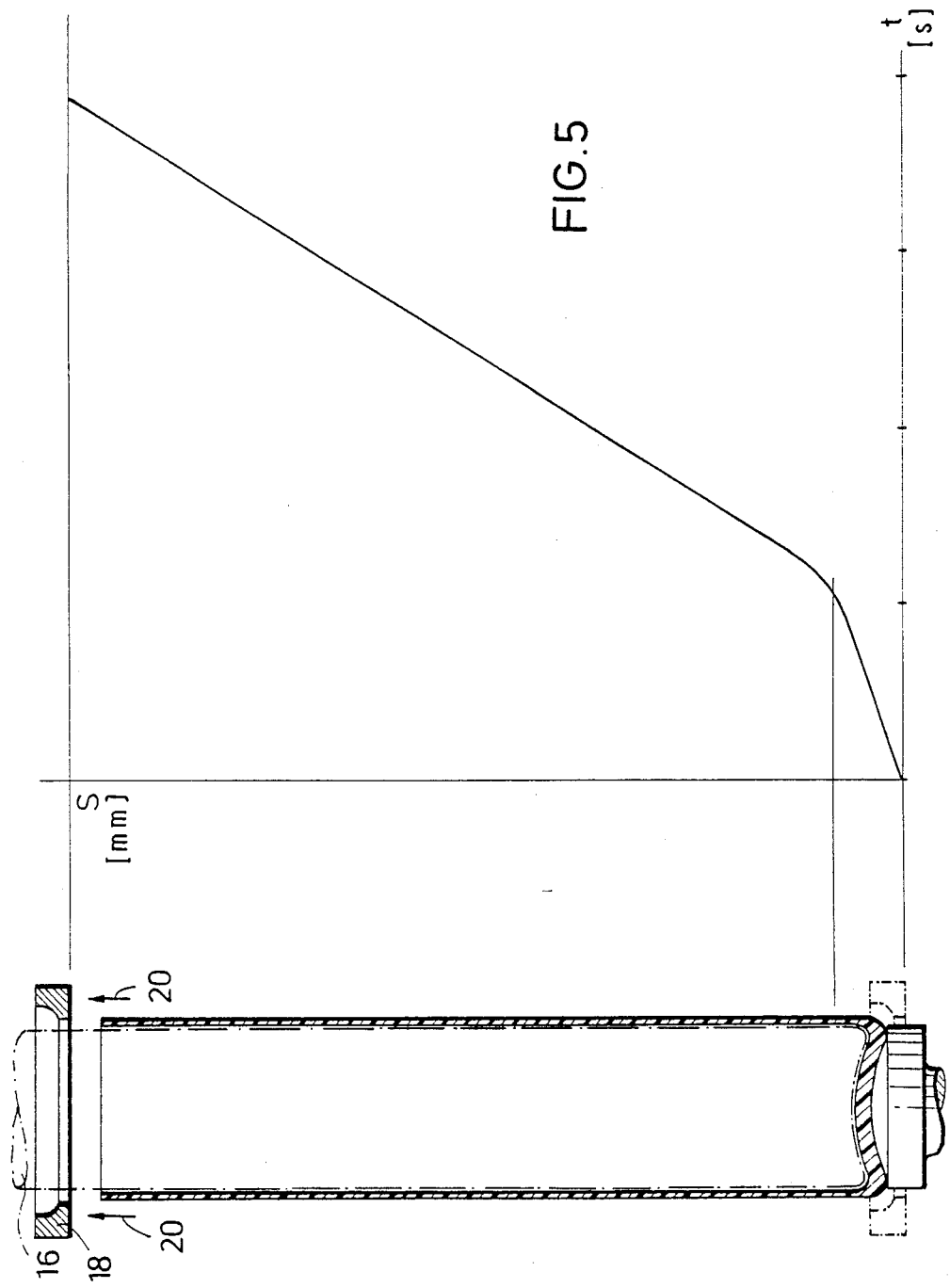
FIG. 5 is a graph showing the speed of movement of the drawing ring during the operation of stretching the preform.

The process according to the invention is carried out in such a way that the preform 10 which is produced for example by an injection molding operation is heated prior to the stretching operation. For that purpose, it is introduced into a chamber 28 of a temperature control arrangement indicated at 29 in FIG. 5. The arrangement 29 is provided with an electrical resistance heating means in the form of a coil 30, the inside diameter of which is substantially larger, as shown in FIG. 5, than the outside diameter of the preform 10, whereby there is a free annular space between the heating coil 30 and the preform 10. The longitudinal axis of the heating coil 30 is at least substantially coincident with the longitudinal axis of the preform 10. The preform 10 to be heated is held within the heating chamber 28 by means of two vertically movable components 31 and 32, the lower component 31 which is adapted to the configuration of the bottom portion 12 of the preform engaging the bottom portion 12 so that the preform 10 sits on the component 31. At the top, the preform 10 is held in position by the upper component 32 which is adapted to the upper edge configuration of the cylindrical portion 14 of the preform, which is provided around the opening of the preform 10. The component 32 thus closes the upwardly facing opening of the preform 10. Moreover the two components 31 and 32 are of such a configuration that they are in engagement with the preform 10 only when the preform 10 occupies within the chamber 28 a position in which its longitudinal axis is substantially coincident with the longitudinal axis of the chamber 28. The components 31 and 32 thus produce a centering effect. As the two components 31 and 32 also screen or shield the preform 10 from the exterior, at the two ends of the heating chamber 28, the illustrated arrangement ensures that the preform 10 can be accurately heated to specified temperatues so that all preforms 10 which are successively heated in the heating chamber 28 are heated to the same temperature. The bottom-engaging component 31 which is of a ram or punch-like configuration as illustrated is cooled so that the bottom 12 of the preform does not experience any increase in temperature, or at least it does not experience a substantial increase in temperature.

Figure 6:
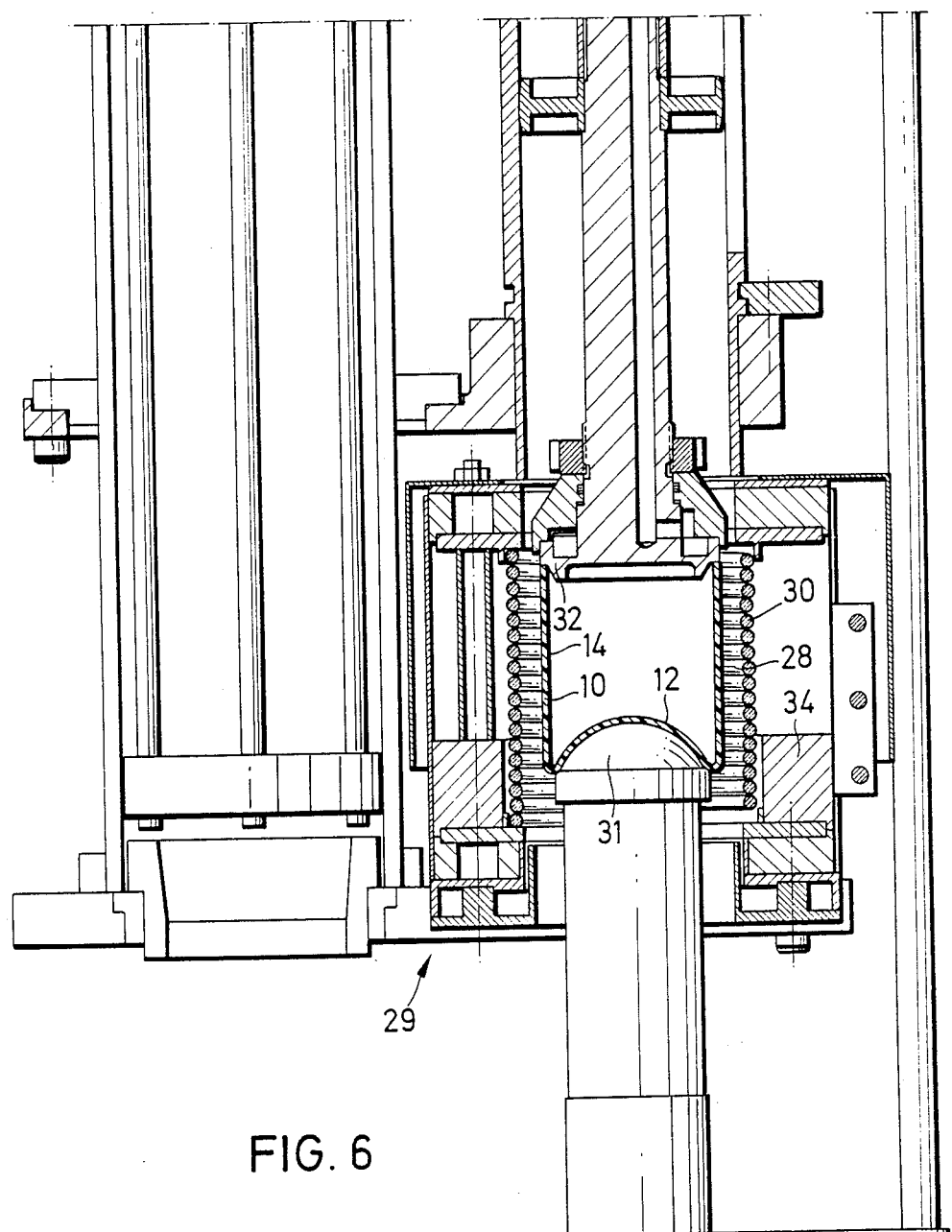
FIG. 6 is a side view in partial section of an apparatus for heating the preform prior to the stretching operation.

Referring still to FIG. 6, it will be seen therefrom that in the lower region of the heating chamber 28, the coil 30 is surrounded on its outside by a ring 34. The function of the ring 34 is to provide a shielding or reflector effect such that in the region of the ring 34, the heating coil 30 radiates less heat in an outward direction, with the result that in the region over which the ring 34 extends vertically, within the coil 30, the temperature rises to a greater degree than in the remaining part of the heating coil 30 which is above the ring 34, which in turn means that in the lower region of the preform 10 is heated to a greater degree than in the portion of the preform 10 which lies above the top surface of the ring 34, namely in the major part of the cylindrical wall portion 14 of the preform 10.

Reference will now be made to FIG. 4 showing a graph in which the temperature is plotted in degrees C on the absicssa. The ordinate represents the axial dimension, that is to say the height of the preform 10, prior to the beginning of the stretchig operation involving the upward movement of the ring 18 as shown in FIGS. 2 and 3. The mean temperature curve shown in FIG. 4, in relation to the axial dimension of the preform 10, corresponds to the time at the commencement of the stretching operation using the drawing ring 18. The temperature curve in relation to the axial dimension of the preform 10 shows, that, in the lower region which corresponds to the region of the preform which is screened by the ring 34 in the heating chamber 28, the temperature to which the preform 10 has been heated is for example 75° C. In the specific situation illustrated, that temperature extends substantially over the bottom seventh of the height of the preform and it then goes to a mean temperature of the order of magnitude of 65° C. to which the preform has been uniformly heated along the remainder of its axial dimension.

Referring now to FIG. 5, shown therein is a graph in which the ordinate represents the distance covered by the drawing ring 18 in the course of the preform stretching operation while the abscissa represents time. The abscissa also plots the axial length of the completely stretched end product. The cuve of the travel-time graph in FIG. 5 shows that the stretching operation is comemnced at a speed which is about 1 metre per minute in the lower region of the preform which approximately corresponds the region which is at elevated temperature. After the initial phase of the stretching operation, the stretching speed is then increased to about 3 metres per minute. That speed is then maintained to the end of the stretching operation.

Reference will now again be made to FIG. 2 of the drawings showing an intermediate stage during the stretching operation, at which approximately the lower half of the axial extent of the preform shown in FIG. 1 has already been subjected to stretching. It will be seen from FIG. 2 that, at that time, and on the asumption that the final length of the stretched article is about three times the initial length, that is to say the length of the preform in FIG. 1, the remaining length of the preform which has not yet been stretched constitutes about one third of the length of the portion of the preform which has already been subjected to stretching.

Although in the specific embodiment described hereinbeofre the initial speed of 1 meter per minute is relatively low in comparison with the final speed of 3 meters per minute, that does not in any way alter the fact that, in comparison with the state of the art, the increased temperature in the lower portion of the preform means that the stretching operation using the drawing ring 18 can be commenced at a markedly higher speed, without any fear of over-stressing the material of the preform in that operation. The higher temperature in the lwoer portion of the preform also contributed to ensuring that, in spite of the fact that the stretching speed in the initial phase is higher than in previous processes, the material which is to be stretched is supported at the support shoulder of the drawing ring 18 in a uniform manner which is advantageous in regard to the operation of changing the shapeof the preform by stretching thereof, so that the transition from the higher-temperature portion of the preform to the subsequent portion of the preform, where higher stretching speeds are to be applied, which are also markedly higher than the speeds involved in previous processes, can be effected without difficulty and in particular without causing unacceptable stressing of the plastic material.

The above-mentioned stretching ratios of 3 or 3-4 are those which are usually employed when using polyethyleneterephthalate and which may also be dependent on temperature, within certain limits. Other stretching ratios may also be employed when using other plastic materials.

The product of the stretching operation, that is to say the article shown in FIGS. 3 and 5, may be used as a finished product or as an intermediate product or parison which can be modified by further transformation operations.

It will be appreciated that the above-described process has been set forth solely by way of example of the teachings of the present invention and that various modifications and alterations may be made therein without thereby departing from the spirit and scope thereof.

What is claimed is:

1. In a process for producing hollow bodies from preforms of thermoplastic material, each of said preforms having an axis, a cylindrical wall portion extending along the axis, a bottom portion closing a first end of the cylindrical wall portion, and an open second end, comprising heating the cylindrical wall portion to a temperature below the vitreous transition temperature of the material and then stretching the heated cylindrical wall portion of the preform, the improvement comprising: heating a first section of the cylindrical wall portion of the preform adjacent the bottom portion of the preform to a temperature higher than a temperature to which a second section of the cylindrical wall portion of the preform which adjoins said first section is heated, stretching the first section of the cylindrical wall portion of the preform at a lower speed than the speed at which the second section of the cylindrical wall portion of the preform is stretched.

2. The method of claim 1 wherein the heating step is performed by a heating apparatus separate from a stretching apparatus which performs the stretching step.

3. The method of claim 2 wherein the heating step further comprises the steps of positioning a preform within the heating apparatus; the heating apparatus including a heater surrounding the cylindrical wall portion of the preform; radiating heat from the heater, and reflecting a greater portion of the heat radiated by the heater onto the first section of the cylindrical wall portion of the preform than is reflected onto the second section of the cylindrical wal portion of the preform.

* * * * *